D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 1.

FIG. 1.

Witnesses
Wm Taft
C Render

Inventor
DAVID F. DOMIZI
By Edward R. Inman
Attorney

D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 4.

Inventor
DAVID F. DOMIZI

Witnesses

By Edward R. Inman
Attorney

D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 5.

Inventor
DAVID F. DOMIZI

Witnesses

By Edward R. Inman
Attorney

D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 6.

WITNESSES

INVENTOR
DAVID F. DOMIZI
BY
ATTORNEY

D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 7.

Inventor
DAVID F. DOMIZI

D. F. DOMIZI.
FINISHING MACHINE FOR THE PERIPHERY OF PISTON RINGS.
APPLICATION FILED AUG. 17, 1912. RENEWED MAY 26, 1915.

1,162,581.

Patented Nov. 30, 1915.
10 SHEETS—SHEET 10.

WITNESSES

INVENTOR
DAVID F. DOMIZI
BY Edward R. Inman
ATTORNEY

UNITED STATES PATENT OFFICE.

DAVID F. DOMIZI, OF FRANKLIN, PENNSYLVANIA.

FINISHING-MACHINE FOR THE PERIPHERY OF PISTON-RINGS.

1,162,581.  Specification of Letters Patent.  Patented Nov. 30, 1915.

Application filed August 17, 1912, Serial No. 715,601. Renewed May 26, 1915. Serial No. 30,675.

*To all whom it may concern:*

Be it known that I, DAVID F. DOMIZI, a citizen of the United States, residing at Franklin, in the county of Venango and State of Pennsylvania, have invented certain new and useful Improvements in Finishing-Machines for the Periphery of Piston-Rings, of which the following is a specification.

The object, construction and utility of my improved finishing machine for the periphery of piston rings, are herein set forth with sufficient clearness to enable those skilled in the art to which it appertains, to make and use the same.

*Object.*—The object of said invention is, to provide a machine wherewith the periphery of piston rings may be finished completely,—that is, both turned or tooled and also ground without rechucking the same or transferring the rings from one machine to another. Heretofore it has been the practice to turn such rings in one machine, then transfer them to another for the final finishing and grinding process, but the degree of accuracy which has recently become necessary in motors employing these rings, and especially those entering into the construction of automobiles, marine and aviation craft, has made it desirable that a method of finishing which is conducive to greater accuracy and speed should be employed. In the finishing of the best grade of such rings, the best results are obtained by turning them to a diameter that is a minute fraction of an inch—about one thousandth of an inch—larger than the required, final, finished size, then to remove the surplus stock by the process of grinding, and where the rings must be transferred to another machine and rechucked for the grinding operation, such rechucking must be very accurately done, in order to place the ring so that its whole periphery will be subjected to the action of the grinding-wheel.

To avoid such rechucking is, therefore, the particular object of this invention, and to attain said object, I have provided a machine which will perform the two operations upon the ring, and whereby rechucking is dispensed with.

*Drawings.*—In the drawings, which form a part of this application, I have shown one form of construction whereby my inventive idea is practically embodied, but said drawings are illustrative merely and are not intended to define the embodiment of this invention by the precise construction there shown. Many modifications could be employed without departing from the scope of my invention as defined in the claims. The various figures of said drawings are as follows:—

Figure 9:
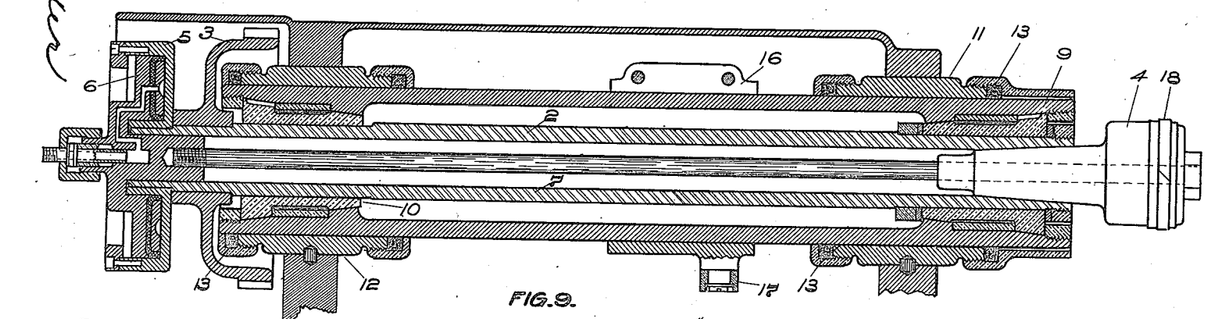
Fig. 9 is a longitudinal section of the spindle of my machine.

*Construction.*—Briefly stated, my machine consists essentially of a revoluble, longitudinally-movable spindle, and means for imparting thereto said movements; said spindle being equipped at one end with a chuck for holding a piston-ring in such manner that the periphery of said ring is accessible for the desired operations thereon, and in addition to said spindle, tools for turning said periphery and an abrasive wheel for imparting thereto a final finish; both of which operations are performed upon the ring while in its original position within said chuck. As accessories to said essential elements, certain mechanism is provided for stopping, starting and governing the action thereof, and means for effecting or obtaining certain adjustments of said elements. Referring to said drawings, the construction in detail, as there shown, is as follows:—Within a suitable frame-work, as 1, is revolubly mounted a longitudinally-movable or reciprocating spindle, shown in longitudinal section in Fig. 9, and which, referring to said Fig. 9, is constructed as follows:—The revoluble portion of said spindle is the hollow shaft 2, to the outer end of which is rigidly affixed the driving-gear 3; the inner end of said shaft is arranged for the attachment of the chuck 4, which is preferably a pneumatically-actuated chuck, and more specifically, is the one shown and described in certain Letters Patent of the United States, issued to me on the 13th day of April, 1912, No. 1,024,882. Upon the outer end of said shaft, is rigidly affixed a cylinder 5 containing a pneumatically-actuated piston 6, to which is attached a rod 7, that passes longitudinally through shaft 2, and is connected to and actuates the clamping mechanism of chuck 4. Said shaft 2 is mounted within a non-revoluble, longitudinally-reciprocable barrel 8, which is provided with the adjustable bearings 9 and 10 for said shaft 2. Bearings 11 and 12 are provided within the bed 1 of the machine, for the reception of said barrel, and in which it reciprocates freely. Dust-proof packing 13 excludes abrasive material from said bearings.

The driving-gear 3 is for the purpose of revolving shaft 2 and the therein-contained chuck 4.

Figure 2:
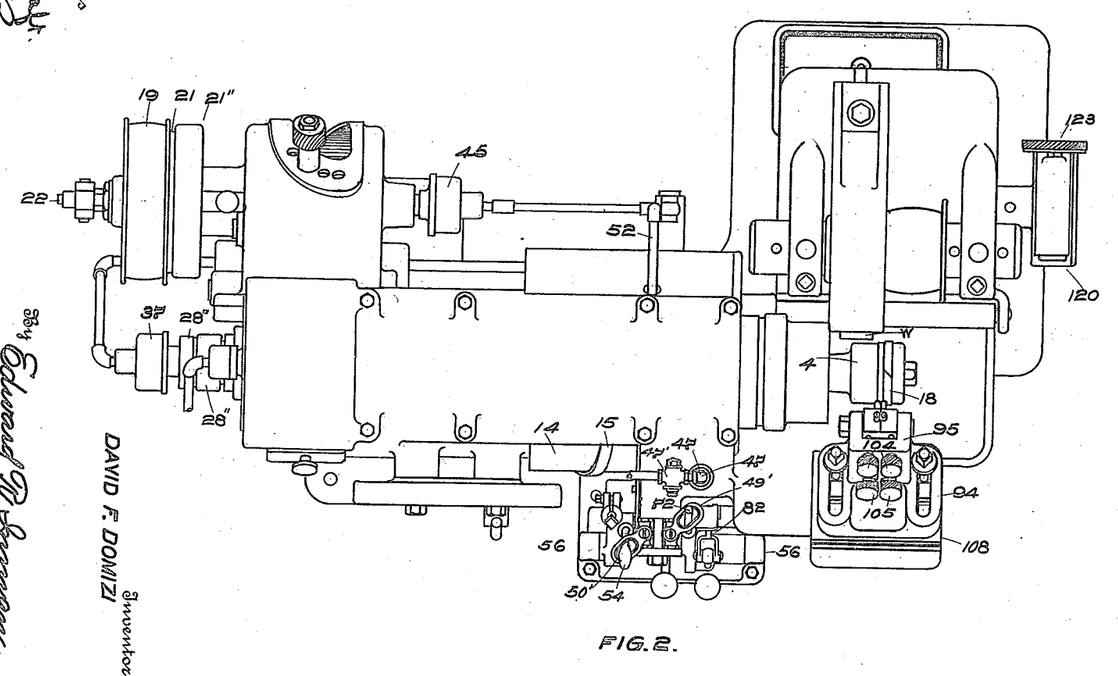
Fig. 2 is a plan view.
Figure 3:
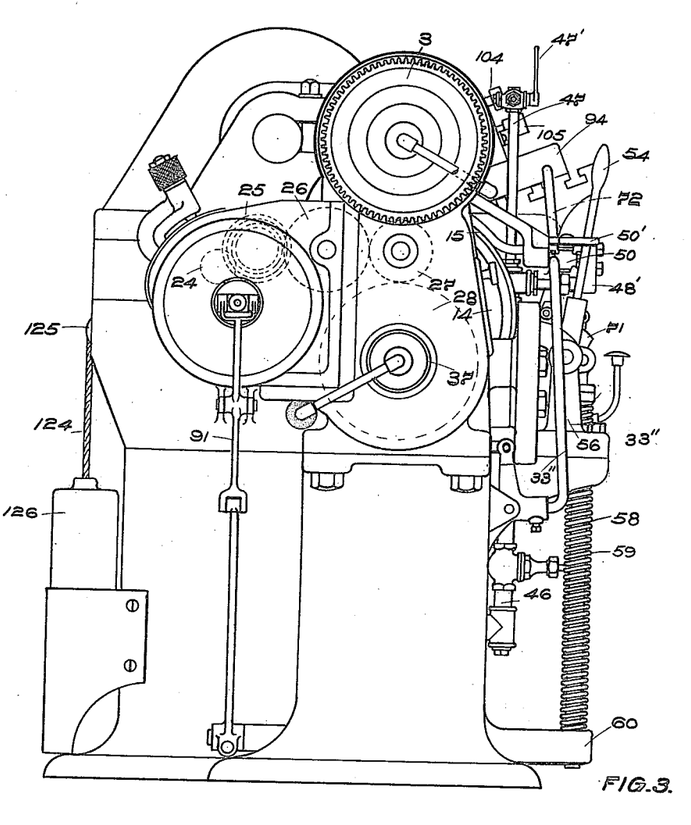
Fig. 3 is a left end elevation.
Figure 4:
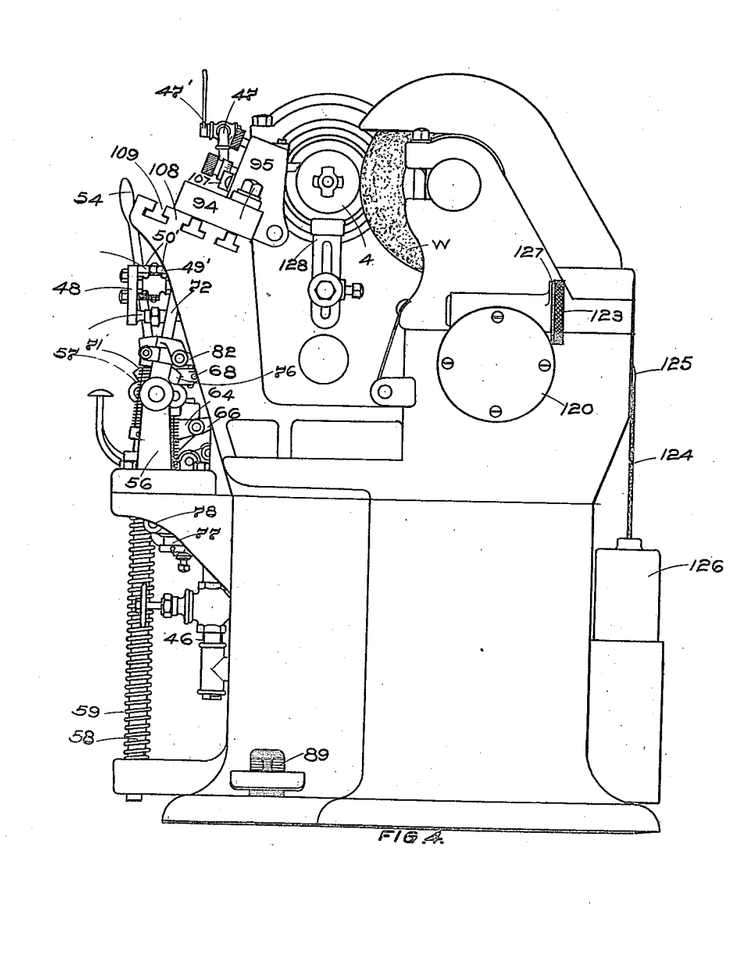
Fig. 4 is a right end elevation.

For the purpose of imparting a longitudinal or reciprocating movement to the spindle, as a whole, I employ the following mechanism,—see Fig. 5:—Directly below the spindle-barrel 8, is revolubly-mounted a cam-wheel 14, upon the periphery of which is provided the cam 15. Upon the barrel 8 is rigidly secured a collar 16, the under side of which is provided with a cam-roller or follower 17. As said cam-wheel revolves, cam 15 impinges upon said follower and thereby causes it to move in accordance with the sinuations of said cam, that is to say, so that the spindle moves longitudinally for a sufficient distance to cause the piston-ring 18 in chuck 4 to be fed from the position shown in Fig. 2, past the tools T and the abrasive-wheel W and back again to the original position, which is that shown in said Fig. 2.

The spindle and cam-wheel 14 are driven by a system of gearing shown especially in Figs. 5, 6, 7 and 8. The pulley 19 is a clutch-pulley and is belted to any suitable power, whereby it may be caused to revolve continuously while the machine is in operation; said pulley 19 is loose upon its shaft 20; a clutch-member 21, which is free to move longitudinally upon shaft 20, but is non-revolubly connected thereto by means of the key 21', is adapted to engage said pulley 19 for the purpose of driving said shaft and the gearing mounted thereon. Key 21' passes through the actuating-rod 22, and engages the hub of the clutch-member 21, and when said rod 22 is moved longitudinally, it causes a corresponding movement of said clutch-member, for the engagement or disengagement of pulley 19. The means whereby said rod is longitudinally actuated, will presently be described. A stop-member 21'' is provided with which member 21 may be engaged, and when such engagement takes place, the machine is caused to stop instantly, so that the inertia of the moving parts cannot prolong the stopping-action. A pinion 23 is feathered to shaft 20, and from this, motion is transmitted to the spindle, through a train of gears consisting of the spur-gears 24, 25, 26 and 27. Gears 24 and 25 are adapted to obtain various changes of speed, but this particular feature is commonly employed in the art of machine-tool construction, hence it will not be described in detail. As previously stated, the spindle moves longitudinally, as does also gear 3, and to provide for this movement, pinion 27 is of sufficient length so that said gear 3 is always in mesh therewith, as it reciprocates. Motion is transmitted from said gear 27 to the cam-wheel, through a train of gears consisting of the spur-gear 28, miter-gears 29 and 30, spur-gears 31 and 32, and the worm 33 and worm-wheel 34. Said worm 33 is loose upon its shaft, and is formed at one end into a clutch-member, as shown in dotted lines in Fig. 6, the companion-member of said clutch is feathered to the shaft 33' and may be engaged and disengaged by means of the lever 33''.

Figures 5, 6, 7, 8:
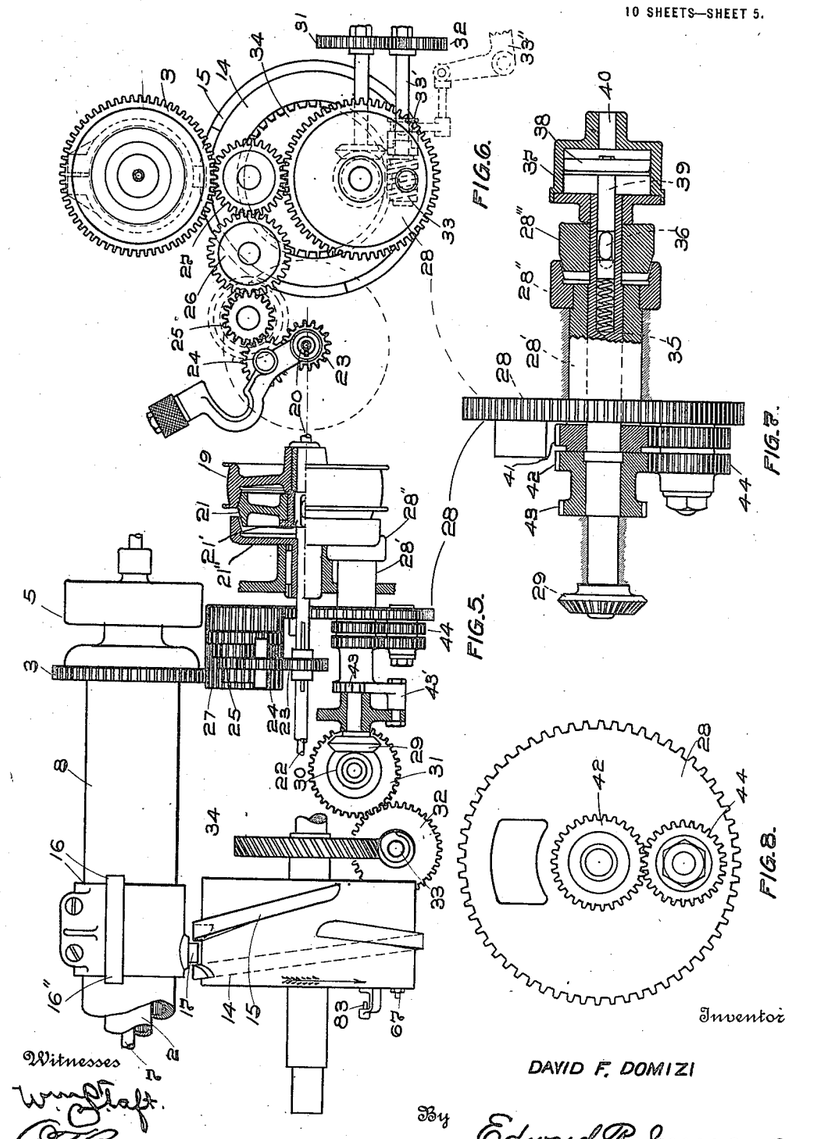
Fig. 5 is a rear view of the driving and transmission gearing by means of which both a revolving and longitudinally-reciprocating movement is imparted to the spindle. This view is taken from the opposite side of the machine to that shown in Fig. 1.
Fig. 6 is a left end elevation of said gearing.
Figs. 7 and 8 are details of said gearing.

The mechanism shown in Fig. 7 is the construction whereby the previously mentioned acceleration of the feed or longitudinal movement of the spindle after the rings have passed the tools, is obtained. A planetary gear forms a portion of this mechanism and the construction is as follows:—Gear 28 is normally loose upon its shaft 35, and is provided with a sleeve 28' having the cup-member 28'' of a cone-friction clutch. The cone-member 28''' of said clutch is longitudinally-movable upon shaft 35, but non-revolubly attached thereto by means of the key 36, which passes through a slot in said shaft 35. Upon the outer end of said shaft, is affixed a cylinder 37, in which is a piston 38, having a rod 39 that projects into the shaft 35—which is bored out at this end—and the inner end of said rod 39 bears against the key 36, and when compressed air is admitted to said cylinder through the port 40, it moves the piston accordingly and causes member 28''' to engage member 28'' of the clutch. Upon shaft 35 is rigidly affixed a pinion 41, and also upon said shaft is revolubly or loosely mounted a sleeve which is formed into a pinion 42 at one end, and into a ratchet-wheel 43 at the other. A ratchet 43' is provided for engaging said ratchet-wheel 43, and this holds said sleeve stationary when the clutch (28" 28''') is not engaged,—that is to say,—during the slow speed.

To one face of gear 28 is revolubly attached a pinion 44, which meshes with pinions 41 and 42. When said clutch is disengaged and gear 28 is revolved—gear 42 being held stationary by the ratchet, as aforesaid—gear 44 is thereby caused to revolve, and this transmits a slow motion to gear 41 and to the shaft 35, to which said gear 41 is rigidly affixed. When, however, the clutch 28", 28''' is engaged, this causes all of said gearing shown in Fig. 7 to revolve in unison and at a much more rapid speed than that at which it formerly moved. It will be readily understood that this difference of speed is communicated to the cam-wheel 14, and through it, to the longitudinal movement of the spindle and the thereto-attached chuck 4. The slow movement above set forth takes place while the chuck is passing, and the ring therein is being operated upon by the turning-tool. The rapid speed is employed while the ring is being operated upon by the grinding wheel and subsequent thereto until the return of the spindle and chuck to its original or starting position.

As originally stated, pulley 19 is belted to suitable power and revolves continuously, and means are provided whereby a manually-actuated lever causes air to enter the cylinder 45, which is attached to shaft 20, and this causes the engagement of the clutch-member 19 with said pulley and starts the machine to operating. Means are also provided for automatically causing the acceleration of feed above-mentioned, and also for automatically stopping the machine at the completion of the work upon the ring. The mechanism whereby these several functions are accomplished will now be set forth.

As previously stated, clutch-members 19, 20 are engaged by pneumatic actuation, through the medium of cylinder 45 and clutch-members 28", 28''' are engaged by pneumatic actuation through cylinder 37. It will thus be understood that pneumatic actuation is mainly employed for causing and controlling the various functions of my machine.

Figure 15:
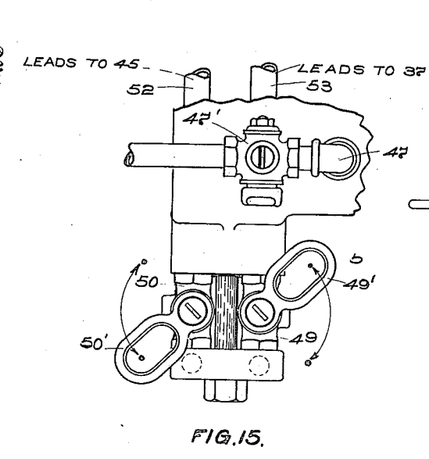
Figs. 15, 16 and 17 are details of the air-valves by means of which compressed air is controlled for the actuation of various clutches employed in my machine.
Figure 16:
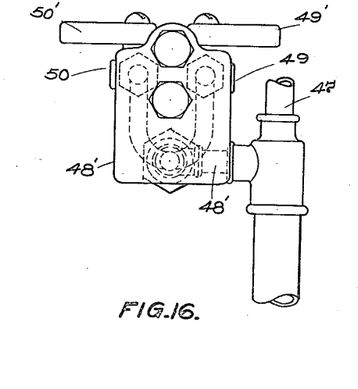
Figure 17:
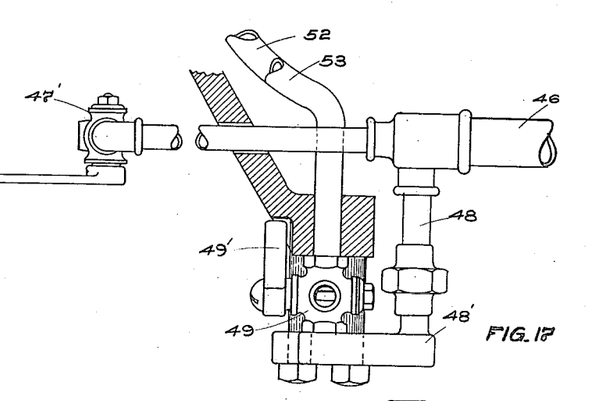

For the purpose of supplying air to the various cylinders 5, 37 and 45, a pipe 46—see Figs. 15, 16 and 17—which may be connected to any suitable air-supply, leads to the front portion of the machine, and one branch 47 thereof leads to cylinder 5, and in same is interposed a three-way cock 47', which is always manually operated for the purpose of actuating chuck 4. To another branch 48 of said pipe, is connected a manifold 48', having two outlets, to one of which is connected a three-way valve 49, and to the other is connected a like valve 50. Each of said valves is provided with a slotted lever 49' and 50' respectively, which are turned to one position to cause the passage of air to said cylinders, to another position, to permit the escape of air from said cylinders. From valve 50 a pipe 52 leads to the starting-cylinder 45, and from valve 49 a pipe 53 leads to the feed-accelerating cylinder 37.

Figures 11, 12:
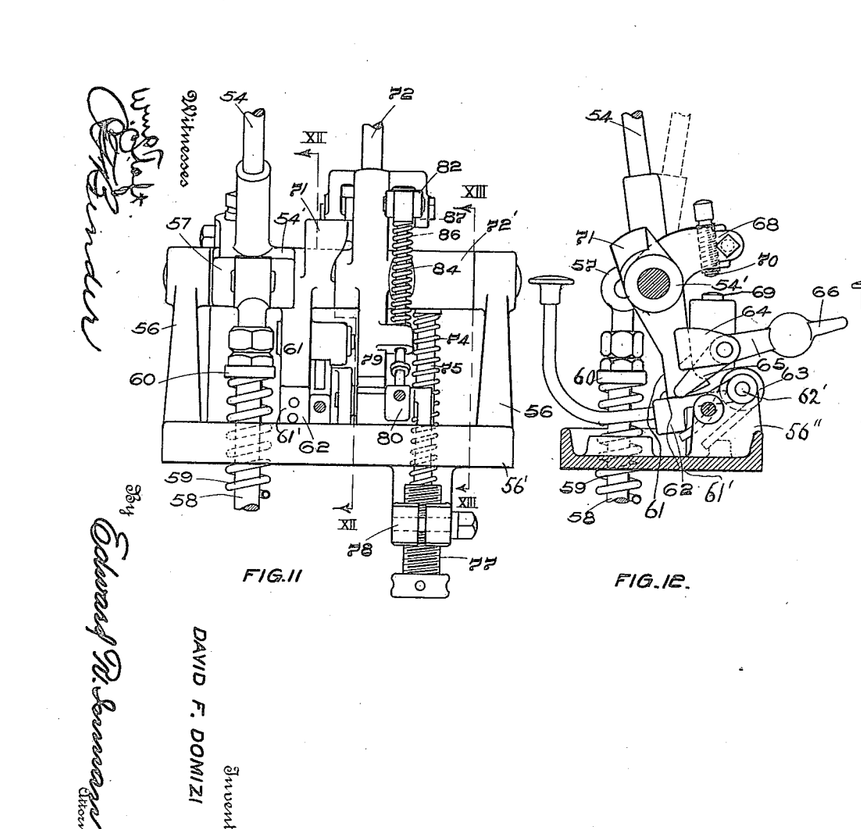
Figs. 11, 12, 13 and 14 are details of the starting and stopping levers and the mechanism by which they are automatically actuated, Figs. 12 and 13 being sections on lines XII—XII and XIII—XIII respectively of Fig. 11.

Upon a suitable bracket at the front of the machine, is mounted a starting-lever,—see Figs. 11 and 12—the handle 54 of which passes through the slot in valve-lever 50' and serves to actuate said lever for the passage of air to and the discharge of same from said cylinder 45. When the machine is to be started for operation, the ring is clamped in the chuck by admitting air to cylinder 5 through valve 47'. Lever 54 is then placed in the starting position,—as shown in the drawings,—this actuates valve 50 so as to cause the air to pass through the same into cylinder 45, and to set the clutch 19, 20, thus putting the machine in motion. Lever 54 is mounted upon a shaft 55, which has a bearing at either end in the brackets 56. The hub 54' or sleeve of said lever 54 is provided with a short arm 57, to which is attached a stem 58, that passes through a heavy, spiral spring 59; a collar 60 is provided upon the stem 58, against which the upper end of said spring bears; the lower end of said spring, rests upon the bracket 60'. Spring 59 has an expansive action, and, as the lever is brought to the starting position shown, said spring is compressed and tends to throw said lever back again to the stop or non-operative position, and to prevent this, the hub 54' of said lever is provided with a downwardly-extending branch 61, and a detent 61" which is carried by the latch 62 is provided, to engage the lower end of said branch, as shown in Fig. 12. Said latch 62 is spring-held in the engaging position shown, by the spring 63, one end of which rests upon the base 56' and the other end bears upon the lower side of said latch 62. Intermediate said ends, said spring is coiled around the fulcrum or hinge-end of said latch, through which the fulcrum-pin 62' passes to secure said latch to the upwardly-extending lugs 56" of said base. Branch 61 is provided with a lug 64, to which is attached a pawl 65, the free end of which rests upon the latch 62. Said pawl is provided with a lever 66 which extends outward into proximity to the end of cam-wheel 14 and encroaches upon the path of an actuating-pin 67,—Figs. 13 and 14. When said pin 67 comes into contact with said lever 66, said lever is raised, and pawl 65 is thereby depressed, thus lowering the latch 62, and disengaging same from branch 61, and permitting the expansive reaction of spring 59 to throw starting-lever 54 back to the other limit of its movement, as shown in dotted lines in Fig. 12, which stops the machine. In order to limit said backward movement of said lever, I provide a stop-arm 68 upon the hub of lever 54, and arrange the same to contact with the stop 69. By means of the set-screw 70 passing through said arm, said backward movement may be regulated to a minute degree. Said backward movement of lever 54 actuates valve-lever 50, and permits the discharge of air from cylinder 45 back through the three-way valve 50, and this causes a disengagement of clutch-members 19, 20. An actuating dog 71 is affixed to the hub 54', for a purpose which will presently be set forth.

The accelerating mechanism and equipment whereby it is automatically actuated, is as follows:—Upon the same shaft 55 on which the starting-lever 54 is mounted, an accelerating lever 72 is also mounted. The handle of said lever passes through the valve-lever 49' and serves to actuate the same for the passage of air through valve 49. Upon the hub 72' of said lever 72, is formed an arm 73, to which is secured the upper end of a stem 74, that passes through a spiral spring 75, the upper end of which spring bears against the lower face of a shoulder 76, upon the stem 74. The lower end of said spring rests upon the adjustable sleeve 77, which passes through the bracket 78.

Figures 13, 14:
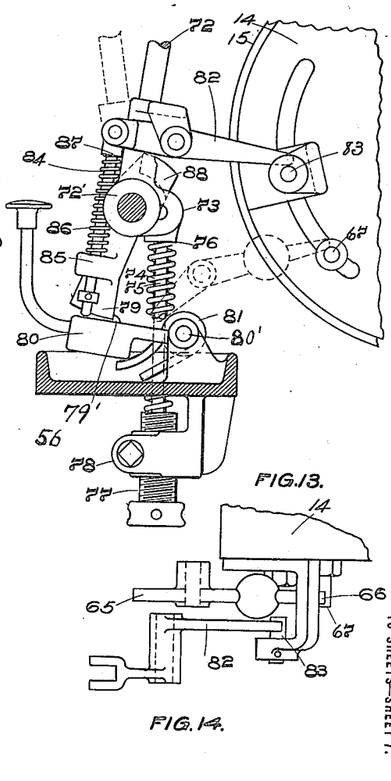

The action of spring 75 is, to carry lever 72 to the position shown in dotted lines in Fig. 13, this being the position which would place valve-lever 49' in the position to allow the air to pass through valve 49 to cylinder 37, and cause an acceleration of the feed. When the machine is first started, however, and until the piston-ring has passed the turning-tools, this action is not desired, and; to prevent it, hub 72' is provided with a downwardly-extending limb 79, the lower end of which is adapted to be engaged by a detent 79' which is carried by the latch 80, which latch is spring held in the engaged position shown, by means of the spring 81, one end of which rests upon the base 56', the other end being inserted beneath said latch 80; intermediate said ends, said spring 63 is coiled around the fulcrum or hinge-end of said latch through which the fulcrum-pin 80' passes to secure said latch to said upwardly-extending lugs 56.

A trip-lever 82 is provided for disengaging the latch 80, the inner end of which lever projects inward and encroaches upon the path of a pin 83, which is attached to the end of the cam-wheel 14. Said lever 82 is provided with a fulcrum or bearing formed upon the lever 72, and to the outer end of said lever is attached a rod 84, which projects downward with its lower end resting upon the latch 80; an eye 85 is provided upon the limb 79, through which said rod passes loosely. A spiral spring 86 surrounds said rod, and the upper end of said spring bears against the shoulder 87. The action of said spring is expansive and tends to throw the outer end of lever 82 upward, and to keep same in the position shown in Figs. 11 and 13. Pin 83 is so positioned that it will come into contact with lever 82 immediately after the piston-ring 18 has passed the tool 19 and immediately at the beginning of the grinding operation. When said contact takes place, the inner contact-end of said lever is moved upward, the outer end is moved downward, and thus, through the medium of rod 84, latch 80 is depressed and disengaged from limb 79, which permits spring 75 to act, and throw lever 72 to the position shown by dotted lines in Fig. 13. This actuates valve-lever 49' and causes the compressed air to enter cylinder 37, and set or engage the clutch-members 28'', 28''', which accelerates the speed of the cam-wheel 14 and quickens the longitudinal movement of the barrel 8 and the other related portions of the spindle, in the manner previously set forth.

As previously stated, the machine is started by a manual actuation of the starting-lever 54, but it is stopped automatically through the actuation of the latch 62 by the lever, 66, when pin 67 comes into contact therewith, and lever 54 is actuated by spring 59 and moved to the stop position, as indicated by dotted lines in Fig. 12. A function of said spring-actuated movement of lever 54 is, to carry lever 72 back to the slow position, and this function is accomplished in the following manner:—Upon the hub 54' is formed a dog 71, which has been previously mentioned; upon hub 72' is formed an inter-engaging dog 88, and when lever 54 is in the operating position shown, and lever 72 is in the accelerating position shown in dotted lines in Fig. 13, the contiguous faces of these dogs are in contact, and when limb 61 is released by the latch 62, spring 59 is sufficiently strong to overcome the action of spring 75 and to move both levers 54 and 72, and when said levers are thus moved, valves 49 and 50 are in the position to allow the escape of air from their respective cylinders 37 and 45. The whole mechanism is then in a position to be restarted and to repeat the various operations set forth.

In order to prevent barrel 8 from revolving within its bearings 11 and 12, the collar 16 is provided with a tongue 16' (Fig.

Figure 1:
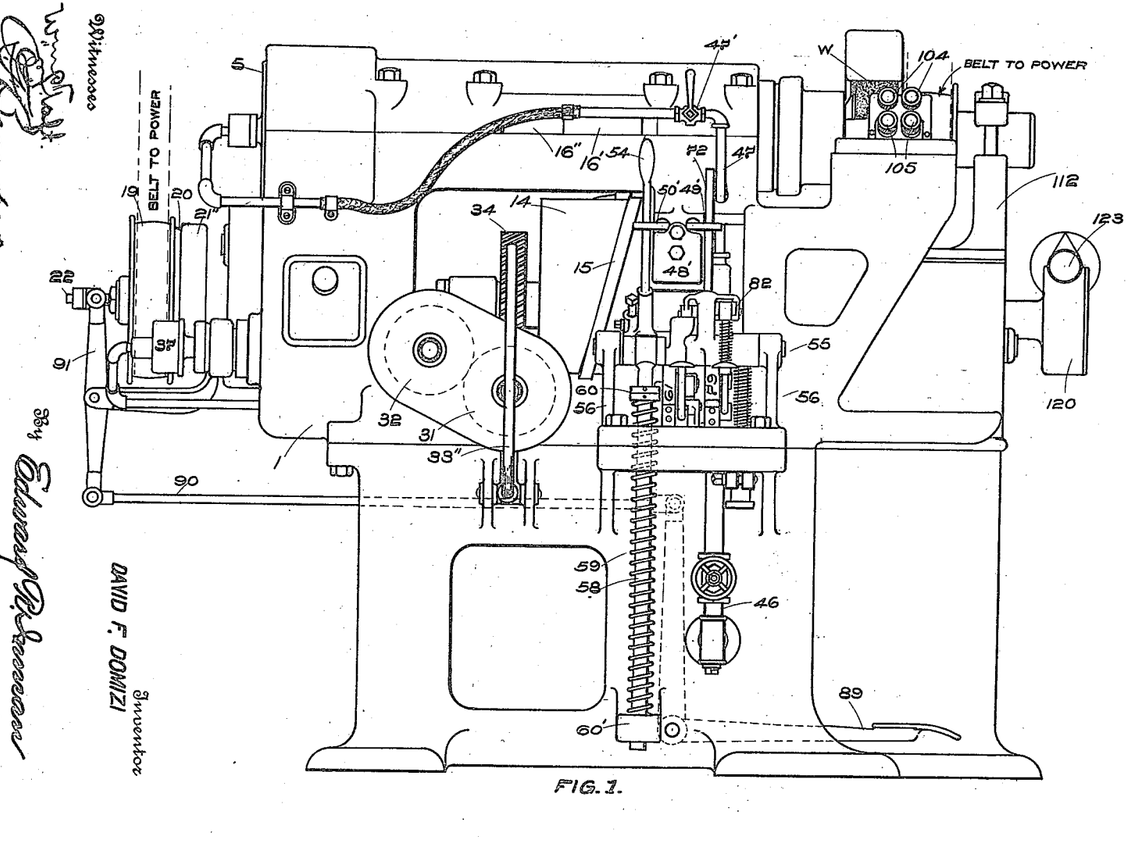
Figure 1 is a front elevation of my complete machine.

5) which projects into the slot 16″ (Fig. 1) in the frame of the machine in which it is free to move longitudinally.

Figure 10:
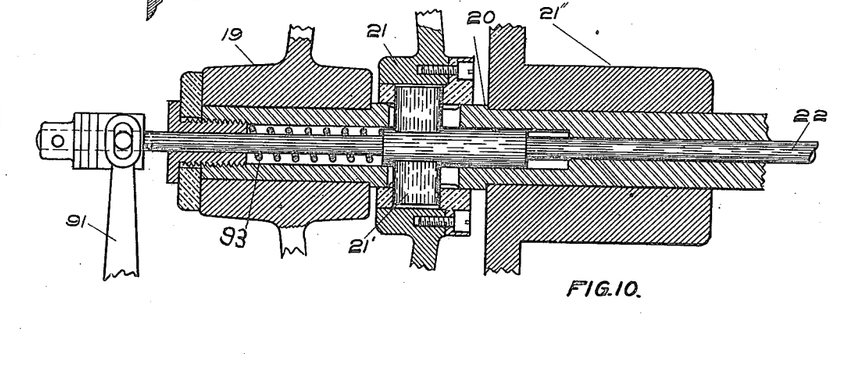
Fig. 10 is a detail of certain clutch-mechanism.

It may, at times, be desirable to set the machine in motion without employing the starting-lever and admitting air to the cylinder 57; in this case, the foot-lever 89 is employed, which acts through the carrier-rod 90, lever 91 and the stem 92 upon the clutch-member 21, and moves same into engagement with pulley 19, thus starting the machine. When the foot is taken from said lever 89, the reaction of spring 93,—Fig. 10—causes the disengagement of said clutch.

Figures 21, 23:
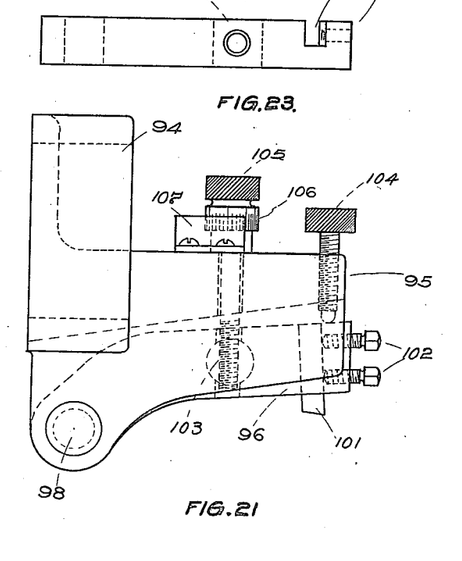
Figs. 21, 22, 23 and 24 illustrate the tool-holder and details thereof, as employed in this machine.
Figure 22:
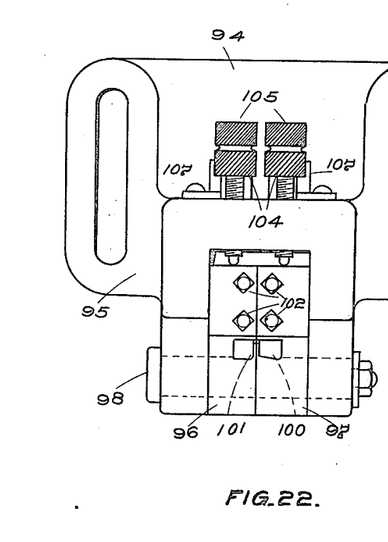
Figure 24:
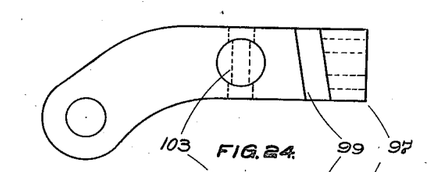

In order that the periphery of the ring may be as smooth as it is possible to make it with the turning tool, it is necessary that said tool be constructed and arranged in such a way that it will not vibrate or chatter, and because of this, I employ a specially-constructed tool, enlarged views of which are given in Figs. 21, 22, 23 and 24. The construction here illustrated is as follows:—I construct a tool-post having a base 94 and a housing 95, in which housing is a vertical gap or slot, adapted for the reception of two tool-holders 96 and 97, as shown in Figs. 23 and 24. The lower end of said holders is suitably bored for the reception of a pin or bolt 98, which passes through both sides of the housing and secures said holders in such manner that the upper end of each thereof is adjustable inwardly and outwardly. In each of said holders is formed a tool-slot 99 for the reception of a cutter 100 and 101, which are secured in position by means of set-screws 102. Through each end of said holders, a cylindrical nut 103 is inserted, for the reception of an adjusting-screw. Passing through the housing 95, at the rear of each tool-holder, are two adjusting-screws 104, 105. The inner end of each screw 104 bears against its respective holder and each screw 105 passes through the nut 103 in its respective holder. When one of the cutters is to be advanced to take a heavier cut, the screw 105 is loosened or unscrewed to the desired amount, then the screw 104 is advanced so as to move the holder and its cutter outward; both screws are then tightened, thus securing the desired adjustment. Two cutters are provided, for the reason that it has been found that a much smoother surface is attained by the use of two tools, each removing a small amount of stock, than can be attained with one tool doing the same work. It will be readily understood that in the construction shown, one tool is adjusted slightly in advance of the other. The screws 105 are provided with graduations 106, and in proximity thereto is located a vernier 107, to indicate the degree of adjustment of said cutters. For the purpose of mounting said tool-post upon the frame of the machine, I provide thereon a tool-platen 108, in which are formed suitable T-slots 109 for the reception of bolts 110, adapted to occupy said slots and the slots 111 in the base of the post, and thus serve to secure said tool-post firmly in position. It will be readily seen that the tool-post thus constructed is adjustable, as a whole, upon the platen.

Figure 19:
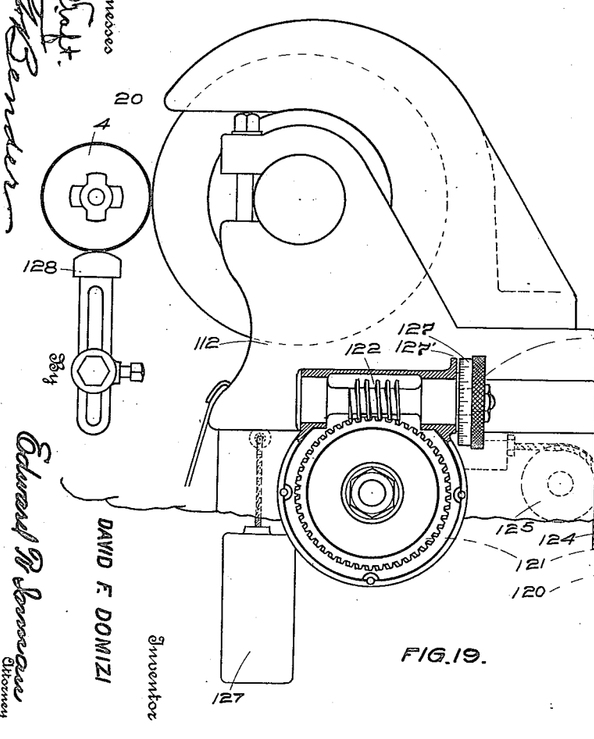
Figs. 19 and 20 show the frame and bearings for the grinding-wheel, also the mechanism by which the same is adjusted.
Figure 20:
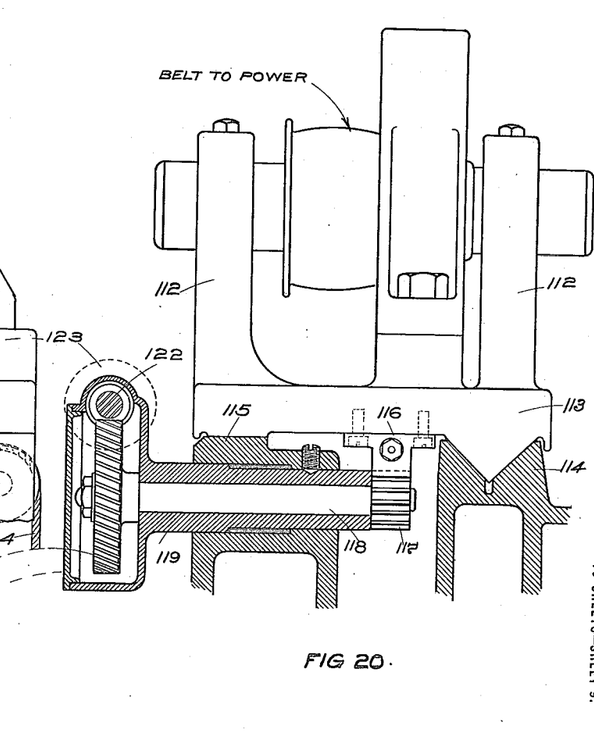

The grinding-wheel 20 and the way in which the stock or frame is adjustably mounted upon the frame of the machine, will be readily understood by a reference to Figs. 19 and 20. Said wheel is mounted upon a suitably constructed arbor, for which bearings 112 are formed upon a base 113. Bed 1 is provided with a suitable shear for the reception of said wheel-stock, as shown in the vertical section in Fig. 20. Said shear is composed of two ways, 114 and 115, upon which the wheel-stock is adapted to slide on a line perpendicular to the axis of chuck 4, thus providing for an adjustment of the grinding-wheel, relative to said chuck 4. Intermediate said ways, base 113 is provided, upon its under side, with a rack 116, with which the adjusting-pinion 117 meshes. The shaft 118 of said pinion is revolubly mounted in a sleeve 119, which passes through way 115. The outer end of said sleeve is formed into a case and bearing 120, for the worm-wheel 121 and the coöperating worm 122. The outer end of the shaft of said worm 122 is provided with a knurled hand-wheel 123, for the purpose of revolving said worm and the wheel 121, also pinion 116, and, by this construction, the wheel-stock and wheel 20 are readily, quickly and minutely adjusted.

It is desirable that any wear in the various parts of this adjusting-mechanism be automatically taken up, and that the wheel 20 should accurately respond to the desired adjustments, as provided and arranged for by said hand-wheel 123, and to secure this object, a cable 124 is secured in any suitable manner to the wheel-stock, then carried horizontally backward over a pulley 125 in the frame of the machine; a weight 126 is then attached to said cable, to exert tension thereon, thus keeping the teeth of rack 116 always firmly in contact with the teeth of pinion 117, thus insuring an accurate transmission from said pinion to said rack.

In order to give to the wheel-stock a sufficient amount of weight and inertia to prevent vibration, a suitable weight 127 is attached thereto. A portion of the hand-wheel 123 is provided with graduations 127, and in proximity thereto, a vernier 127′ is located, to indicate the degree of adjustment.

Beneath the chuck 4, is placed an adjustable gage 128, upon which the ring rests while it is being chucked, to insure the proper centering of same within the chuck.

Figure 18:
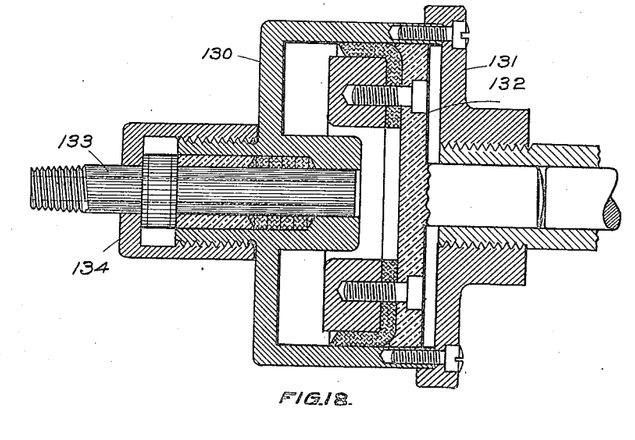
Fig. 18 is a sectional view of a clutch-actuating piston.

In Fig. 18 is shown an enlarged view of a section of the air-cylinders 37 and 45. This device is composed of the following details:—The cylinder 130, head 131, piston 132, the air inlet pipe 133 and the stuffing-nut 134. The piston is moved toward the head 131 by air pressure, but is moved in the opposite direction by the reaction of a suitable spring, as shown in Fig. 7.

I claim—

1. In a finishing machine for the periphery of piston rings, the combination of a turning-tool and a grinding-wheel arranged in proximity to each other, with a revoluble, reciprocable chuck arranged in proximity to said tool and said wheel, adapted to hold such ring and to present same to the action of said tool and said wheel, means for imparting to said chuck said revolving and reciprocating movements, for the purpose set forth, and means imparting to said reciprocating movement different rates of speed during the respective operations of said tool and said wheel.

2. In a finishing machine for the periphery of piston rings, the combination of a turning-tool and a grinding-wheel arranged in juxtaposition to each other, with a revoluble, reciprocable chuck arranged intermediate said tool and said wheel, adapted to hold such ring and to present same to the action of said tool and wheel, means for imparting to said chuck a revolving and a reciprocating movement, for the purpose set forth, and means imparting to said reciprocating movement differential rates of speed during the respective operations of said tool and said wheel.

3. In a finishing machine for the periphery of piston rings, the combination of a turning-tool and a grinding-wheel, arranged in proximity to each other, with a revoluble, reciprocable chuck arranged in proximity to said tool and wheel, adapted to hold such ring and to feed same, first to the action of said tool, then to the action of said grinding-wheel, and means automatically causing an increase in the speed of such feed or longitudinal movement during process of grinding and when the chuck is returning to its original position.

4. In a finishing machine for the periphery of piston rings, the combination of a turning-tool and a grinding-wheel, adjustably arranged in proximity to each other, with a revoluble, reciprocable chuck, arranged in proximity to said tool and wheel, adapted to hold such ring, and to feed the same, first to the operation of said tool, then, in a more rapid movement, to the operation of said grinding-wheel, and means automatically causing the motions of said chuck to cease at the completion of said operation.

5. In a finishing machine for the periphery of piston rings, the combination of a turning tool and a grinding wheel arranged in juxtaposition to each other, with a revoluble reciprocable chuck arranged intermediate said tool and said wheel adapted to hold such ring and to present the same to the action of said tool then to the action of said wheel, means insuring the proper positioning of said ring within said chuck, means for imparting to said chuck a revolving and a reciprocating movement and means causing said reciprocating movement to differentiate during the respective operations of said tool and said wheel, for the purpose set forth.

In testimony whereof I affix my signature in presence of two witnesses.

DAVID F. DOMIZI.

Witnesses:
T. J. DEMPEY,
G. K. BIGLER.